United States Patent [19]

Boula et al.

[11] Patent Number: 4,839,951

[45] Date of Patent: Jun. 20, 1989

[54] PROCESS FOR THE INSTALLATION OF TUBES IN A STEAM GENERATOR

[75] Inventors: Gérard Boula, Fleursault; Alain Georges, Verdun, both of France

[73] Assignee: Framatome, Courbevoie, France

[21] Appl. No.: 90,059

[22] Filed: Aug. 27, 1987

[30] Foreign Application Priority Data

Aug. 27, 1986 [FR] France ................. 86 12126

[51] Int. Cl.$^4$ ............................................. B21D 53/00
[52] U.S. Cl. .................. 29/157.4; 29/157 R; 29/157.3 C; 29/407; 29/523; 165/69; 165/162
[58] Field of Search ............... 29/157.4, 157.3 C, 726, 29/157 R, 157.3 R, 407, 727, 447, 428, 402.08, 523; 165/11.2, 69, 76, 162, 176; 122/32, 510, 512

[56] References Cited

U.S. PATENT DOCUMENTS

| | | | |
|---|---|---|---|
| 3,007,679 | 11/1961 | Byerley et al. | 165/69 |
| 3,212,567 | 10/1965 | Romanos | 165/69 |
| 4,173,060 | 11/1979 | Massaro, Jr. et al. | 29/402.08 |
| 4,386,456 | 6/1983 | Volz | 29/157.3 R |
| 4,653,576 | 3/1987 | Lagally | 165/69 |

Primary Examiner—John K. Corbin
Assistant Examiner—Rick D. Shafer
Attorney, Agent, or Firm—Pollock, Vande Sande & Priddy

[57] ABSTRACT

The process comprises introducing the tubes in the form of horizontal layers (the generator can be positioned horizontally for this purpose), installing anti-vibratory bars on the layers, placing weights on the bars and checking the clearances between the tubes and the bars, so that the tubes falling outside the accepted tolerances can be replaced. This is followed by the installation of the layer of tubes immediately above it. This procedure is repeated until all the layers have been installed. The invention is used in the steam generators of nuclear power stations.

5 Claims, 4 Drawing Sheets

PROCESS FOR THE INSTALLATION OF TUBES IN A STEAM GENERATOR

FIELD OF THE INVENTION

The present invention relates to a process for the installation of tubes in a steam generator.

BACKGROUND OF THE INVENTION

Certain steam generators, and in particular those used in nuclear power stations, have 3000 or more U-shaped tubes, whose branches have a length of about ten meters. These tubes are introduced into a series of perforated spacer plates and their ends are expanded into a tubular plate in contact with the primary water box.

The openings permit an arrangement of the tubes in the form of planar, parallel layers within which they are concentrically positioned in accordance with the spacing of their branches and the radius of the U-shaped part. Moreover, the width of the layers decreases with their distance from the central layer and, as the various layers are centered on the same plane, the general contour of the zone of the U-shaped parts is that of a hemisphere. As the layers are very compact, by analogy of appearance this is called a chignon zone.

The problems which occur in this type of installation are due to vibratory phenomena occurring in the steam generator. The latter has a very elongated shape and is sensitive to the oscillations which are more marked at its top where the chignon is located. The impossibility of arranging supplementary spacer plates at this location, associated with the flexibility of the tubes and their different free lengths, produces complex vibratory phenomena which must be eliminated.

Therefore, anti-vibratory bars are inserted between each planar layer of tubes, whose ends, which project somewhat from the chignon, are then welded to semicircular "hairpins" disposed in accordance with meridians. Thus, a much more rigid assembly is obtained and its vibratory behavior is improved.

However, the positioning of anti-vibratory bars between closely spaced layers with a width of several meters and constituted by tubes which are to a greater or lesser extent deformed, and of which those located within the chignon are virtually inaccessible, still causes certain problems. Insertion is difficult even after the preliminary introduction of a nylon thread between two layers of tubes. Furthermore, excessively buckled or bent tubes are almost always subject to scratches, which in each case constitute corrosion starting points and which are even more likely to occur if installation requires the horizontal positioning of the generator and the lower layers are then highly compressed by the weight of the other layers. After installation, the tubes are inaccessible and their detects cannot be. It is merely possible to attempt to prove by means of long-armed probes that the clearances between the anti-vibratory bars and certain tubes are not excessive. These measurements, performed under poor conditions, are excessively imprecise and are no longer considered reliable. Therefore attempts have been made to develop processes using eddy current, which can at the best establish that defects are absent, but cannot obviate them.

This state of affairs has led to mistrust on the part of the organizations responsible for examining the safety of nuclear power stations, while it is impossible to bring the layers of tubes as close together as might be desired.

SUMMARY OF THE INVENTION

The present invention therefore relates to a new process for the installation of tubes in a steam generator, in which the absence of buckling of said tubes is established by fitting them layer by layer, which makes it possible to remove and replace them if they are outside the permitted tolerances.

The present invention more specifically relates to a process for the installation of tubes in the form of planar layers, separated by in particular intermediate antivibratory bars, in a steam generator, and it comprises the repetition of the following operations:

(1) installing a layer of tubes,
(2) positioning intermediate bars above said layer,
(3) loading by forces along the intermediate bars and perpendicular to the plane of the layer,
(4) checking the clearance between the intermediate bars and each of the tubes of the layer, and
(5) removal and replacement of the tubes, whose clearance is outside the tolerances by correct tubes.

According to a preferred embodiment of the invention, at the time of installation, the steam generator is oriented in such a wway that the layers are horizontal and, in addition, the forces simulate in importance and distribution, the weight of the layers to be disposed above the already installed layers.

BRIEF DESCRIPTION OF THE DRAWINGS

The invention is described in greater detail hereinafter relative to several embodiments and the attached drawings, wherein.

DESCRIPTION OF PREFERRED EMBODIMENTS

Figure 1:
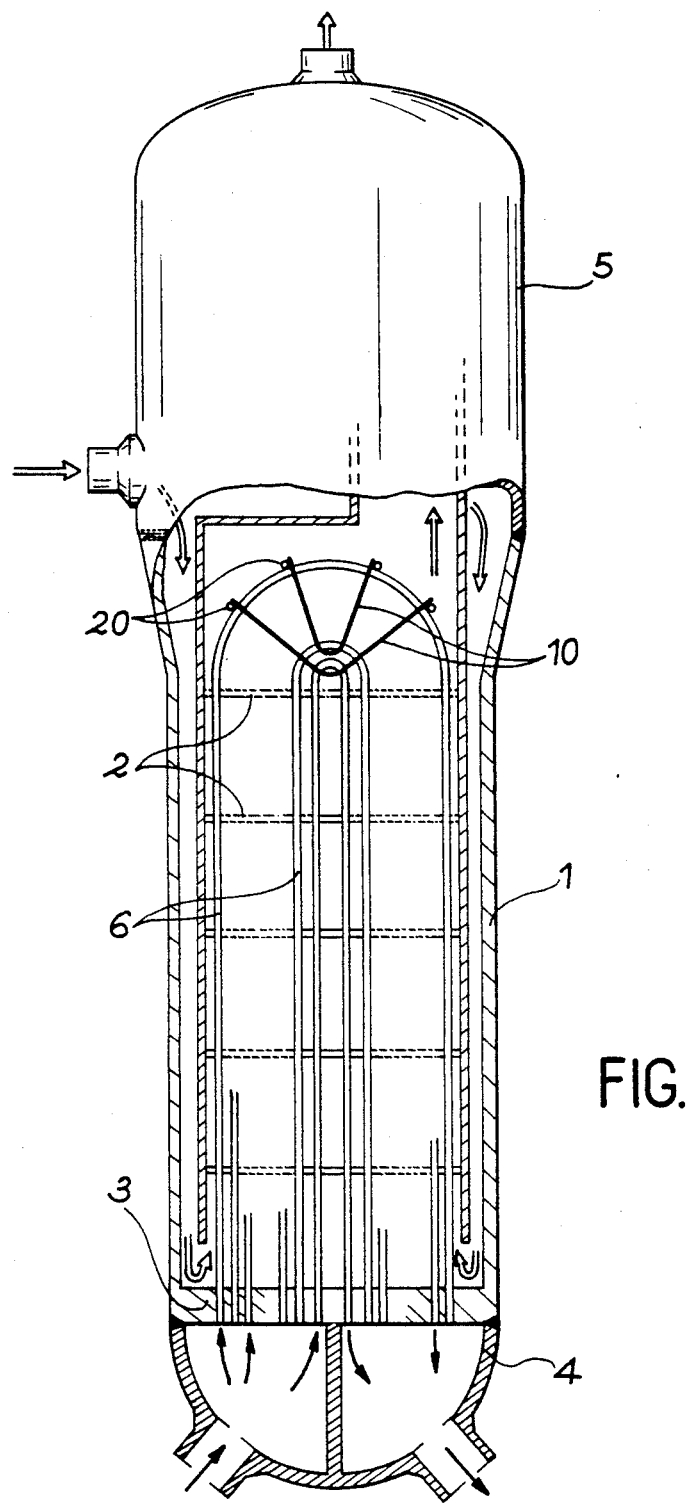
FIG. 1 is an elevation, partly in section, of a known steam generator used in the nuclear industry.

FIG. 1 shows a steam generator identical to that for which the process according to the invention has been conceived. At the time of installing the tubes, the lower ferrule 1, spacer plates 2 and lower tubular plate 3 have been assembled. The water box 4 and the upper ferrule 5, together with all the equipment located within the latter, will be subsequently fitted.

To effect the fitting of tube 6, it is first necessary to horizontally position the lower ferrule 1 and orient it in such a way that the layers of tubes 6 can be horizontally fitted. Means provided with rollers permitting the rotation thereof are used for this purpose.

Figure 2:
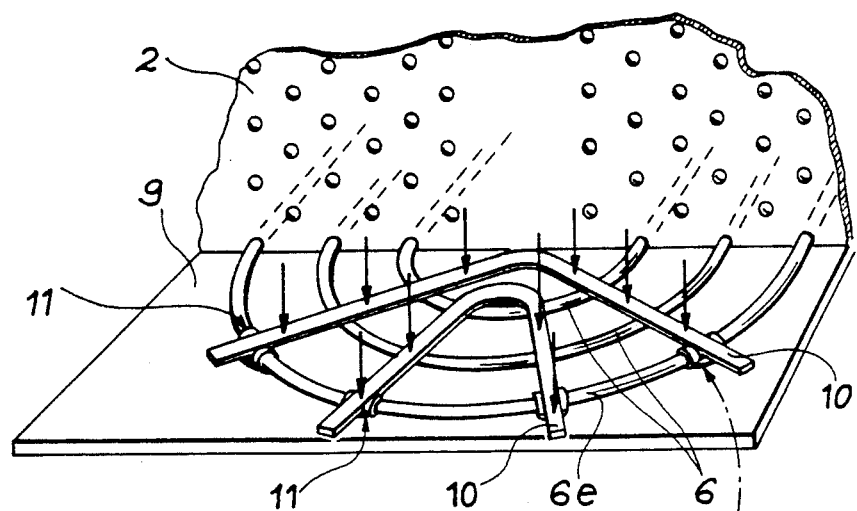
FIG. 2 illustrates the installation of a layer characterizing the inventive process.

As illustrated in FIG. 2, the first operation is to introduce a tube layer 6 positioned in the center of the chignon. The ends of each tube 6 have been equipped with conical bushes ensuring the centering of tube 6 on the holes in the spacer plates 2. The tubes are supplied by the manufacturer in cases in a predetermined order. These cases have a width of approximately 3 meters. It is therefore difficult, if not impossible, for fitters installing the tubes to grasp those which are located closest to the axis of the case by positioning on the sides thereof.

The cases are provided with an intermediate floor between each layer of tubes. The fitters take up the tubes at each end of the U-shaped branches, and only two men are necessary for installing the tubes in a steam generator. Installation of the tubes takes place by the end of the cases and consequently there is no limit to the dimensions of the equipment to be tubed. The fitters gradually insert the tubes 6 until the bushes issue on the outer face of the tubular plate 3. They are then removed and slight expansion is brought about on the ends of tubes 6, so as to axially fit the same, but without preventing possible subsequent extraction of the tubes.

The height of a table 9 is regulated so as to be able to support the tubes 6, whose overhand is excessive in view of their flexibility. When the entire layer has been installed, the anti-vibratory bars 10 are placed above said layer after checking that they essentially belong to one plane. In an optimum manner, several more or less bent bars 10 are arranged in fan-like manner, so as to prevent the displacement of all the tubes 6 in the layer, namely along roughly regularly distributed meridians. These bars are maintained in place with the aid of plastic fasteners constituted by two deformable clips 12 and a connecting body 13, and fixed to the outer tube 6e of the layer. The clips 12 grasp tube 6e, and the gap between them makes it possible to secure the anti-vibratory bars 10 with a limited clearance.

Forces are then applied to bars 10, whereof the distribution and size simulate the weight of the layers, which will then be placed above the layer which has just been installed. These forces are symbolized in FIG. 2 by vertical downward arrows. They can be produced by any appropriate device, such as jacks, or simply by inert masses or weights.

Thus, the anti-vibratory bars 1 bear on the tubes 6 of the layer with a certain distribution of forces. They are in contact with a certain number of them, but have a clearance with respect to other tubes 6 belonging to said layer. It is this clearance which is evaluated with the aid of a random gauge, because all the tubes are readily accessible, which was not the case with the prior art process.

The tubes 6 having an excessive clearance are considered to be defective. They are consequently removed and replaced by other tubes; this is not prevented by the slight expansion performed beforehand to maintain said tubes in place.

When all the tubes 6 of the layer are satisfactory, the next layer is installed immediately above the anti-vibratory bars 10. Above said second layer are placed other anti-vibratory bars, which are loaded in the same way as explained hereinbefore. Obviously the forces are less, because there are fewer layers whose weight is to be simulated. The clearances are checked and the removal of any defective tubes in said second layer takes place as described hereinbefore, so that the tube layers are gradually stacked.

Figure 3:
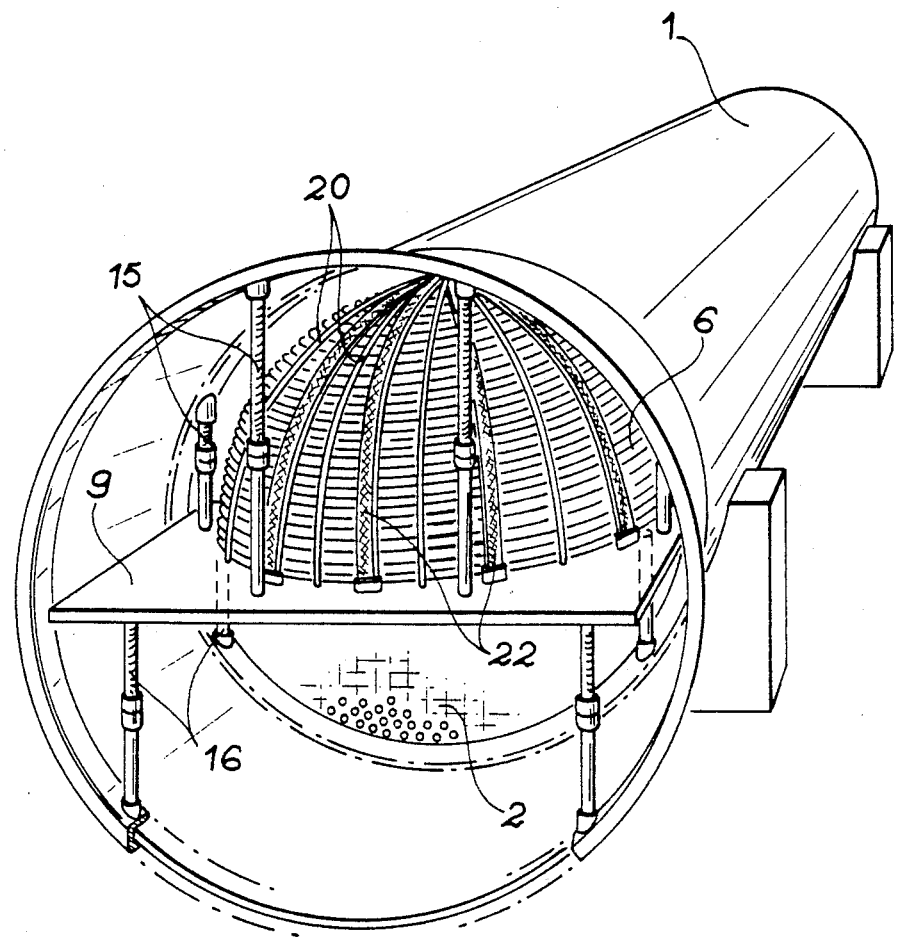
FIG. 3 is a perspective view of the steam generator after fitting the first half of the chignon.

When half the chignon has been formed, the overall arrangement of the steam generator is as shown in FIG. 3. Table 9 which, at the start of installation, made it possible to support the first layer of tubes, now supports the weight of the half-chignon. It must therefore be carried by tie rods 15, which complete the action of supports 16 of table 9. Tie rods 15 and supports 16 must be fixed to the lower ferrule 1 by their other end and as will be shown hereinafter.

Figure 4:
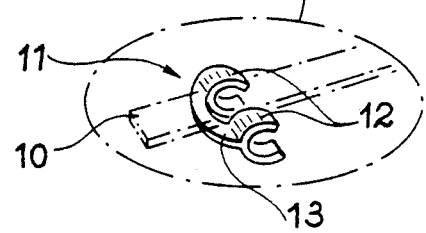
FIG. 4 is a perspective view showing welding of the meridian hairpins of the chignon.
Figure 4:
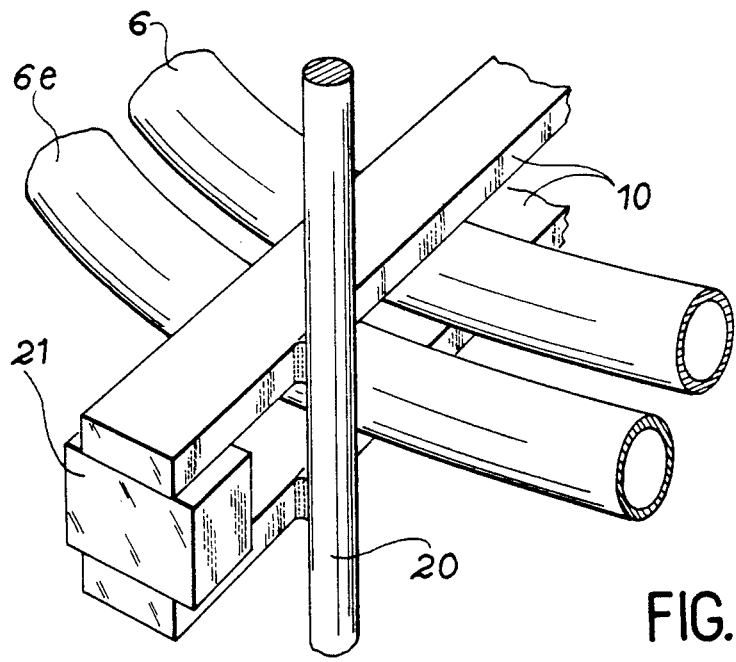

According to a preferred embodiment of the invention, this is followed by the welding of the anti-vibratory bars 10 to one another via connecting pieces or "hairpins" 20. FIG. 4 shows several tubes 6 belonging to the same layer and whereof the tube disposed outside the chignon is designated 6e. It also shows the end of a pair of anti-vibratory bars 10, whose fasteners 11 have been removed.

A regulating shim 21 is placed between the anti-vibratory bars 10, so as to control the deformations produced by the welding of hairpin 20 on the ends of the anti-vibratory bars 10. Hairpins 20 belong to planes orthogonal to those of the anti-vibratory bars 10 and to the layers of tubes 6, which give them an arrangement in meridian form on the chignon, as is clearly visible in FIG. 3.

The hairpins 20 are welded at a distance from the outer tube 6e, which is defined as a function of the expansion of tubes 6 to be performed subsequently. In practice, tubes 6 must be protected by a thermally insulating covering at the time of welding, and which is then removed. The rigidification of hairpins 20 is completed by straps 22 positioned between them and which oppose the deformation of the half-chignon assembled under the action of its own weight. Straps 22 can be replaced by mechanical handling tools for opposing the deformation of the half-chignon. This is followed by the assembly of the other half-chignon.

Following the assembly state shown in FIG. 3, there is a 180° rotation of the lower ferrule 1. The assembled half-chignon then passes into the bottom position and account must be taken of its unbalance by an appropriate braking system.

Figure 5:
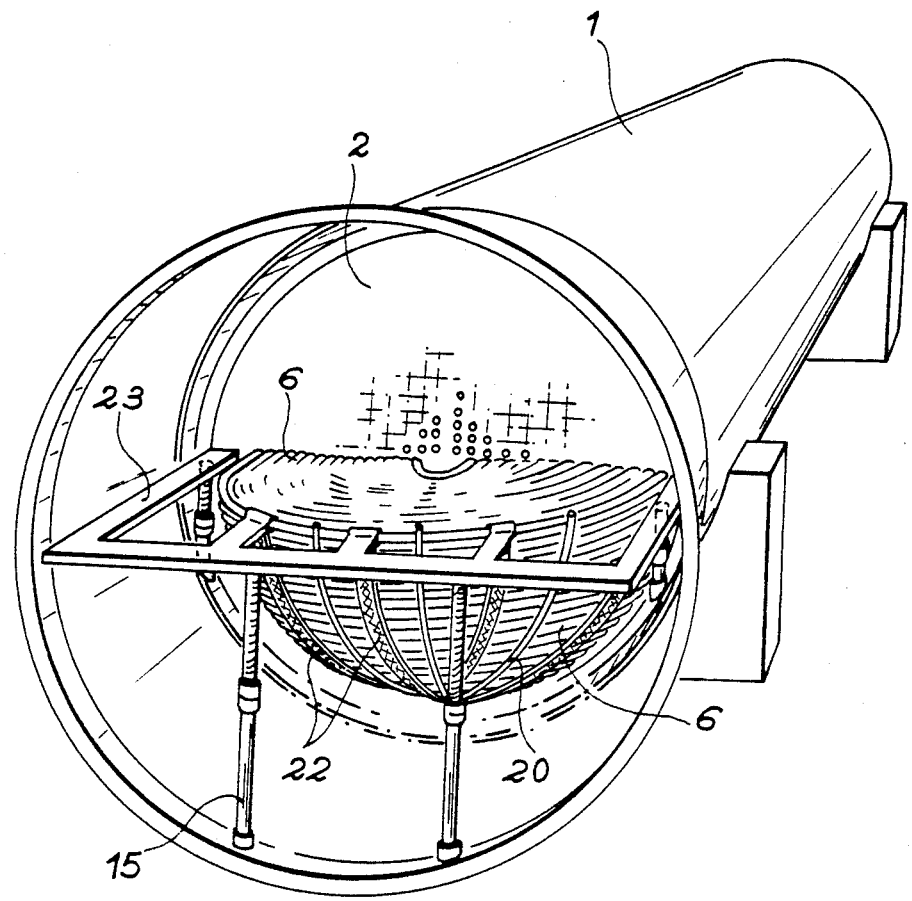
FIG. 5 is a perspective view of the steam generator at the start of installation of the second half of the chignon.

On completing rotation, table 9 is dismantled and replaced by a frame 23, to which are attached the straps 22 and which support the weight of the half-chignon with the aid of the tie rods 15 which have been retained. The configuration shown in FIG. 5 is then obtained.

The second half of the chignon is then installed by tube layers in the manner described hereinbefore, namely installing anti-vibratory bar 10, checking the clearances, replacement of any tubes 6 outside the tolerances and installing a further layer of tubes. The anti-vibratory bars 10 of said second half are then interconnected by means of new hairpins 20. Tubes 6 are then correctly positioned and it is possible to expand them onto the tubular plate 3, after which the installation of the steam generator continues as in the prior art.

It has been found that the process for installing tubes in layers constituting the present invention has the advantage of being able to control defects of said tubes, including those located within the chignon and which were inaccessible with the prior art installation processes. It is also possible to completely eliminate any risk of deterioration resulting from an unskillful introduction of the anti-vibratory bars.

It is therefore possible to guarantee a correct manufacture to the authorities responsible for the safety of nuclear power stations. Another advantage is that the tubes can have a reduced density and can in particular be arranged in a staggered manner, which was not possible with prior art installations.

What is claimed is:

1. A process for the installation of tubes in the form of planar layers, separated by in particular intermediate antivibratory bars, in a steam generator, said process comprising the repetition of the following steps
    (a) installing a layer of tubes;
    (b) positioning intermediate bars above said layer;
    (c) loading said intermediate bars by forces along said intermediate bars and perpendicular to a plane of said layer of tubes;

(d) checking a clearance between said intermediate bars and each of the tubes of said layer; and (e) removing and replacing those of said tubes whose clearance is outside the tolerances by correct tubes.

2. A process for the installation of tubes in layers according to claim 1, wherein, at the time of installation, the steam generator is oriented in such a way tht the layers of tubes are horizontal and wherein the forces simulate, in size and distribution, the total weight of the layers of tubes to be placed above the already installed layers.

3. A process for the installation of tubes in layers according to claim 2, further comprising a stage of fixing said tube layers, as soon as said layers are installed, by means of a slight expansion of the tubes.

4. A process for the installation of tubes by layers according to claim 2, wherein the first layer installed is the central layer of the tubes and wherein all the layers located above said first layer are then installed, after which the steam generator is rotated by 180°, so that the assembled layers pass below the central layer and the installation of the tubes is completed by successive stacks of layers located above the central layer.

5. A process for the installation of tubes by layers according to claim 4, including the step, prior to rotation of the steam generator, of rigidly linking the ends of the already installed intermediate bars by means of connecting hairpins.

* * * * *